June 10, 1930.  H. E. HAMILTON ET AL  1,762,438
CORING MACHINE
Filed Sept. 20, 1924  3 Sheets-Sheet 1

June 10, 1930.　　H. E. HAMILTON ET AL　　1,762,438
CORING MACHINE
Filed Sept. 20, 1924　　3 Sheets-Sheet 3
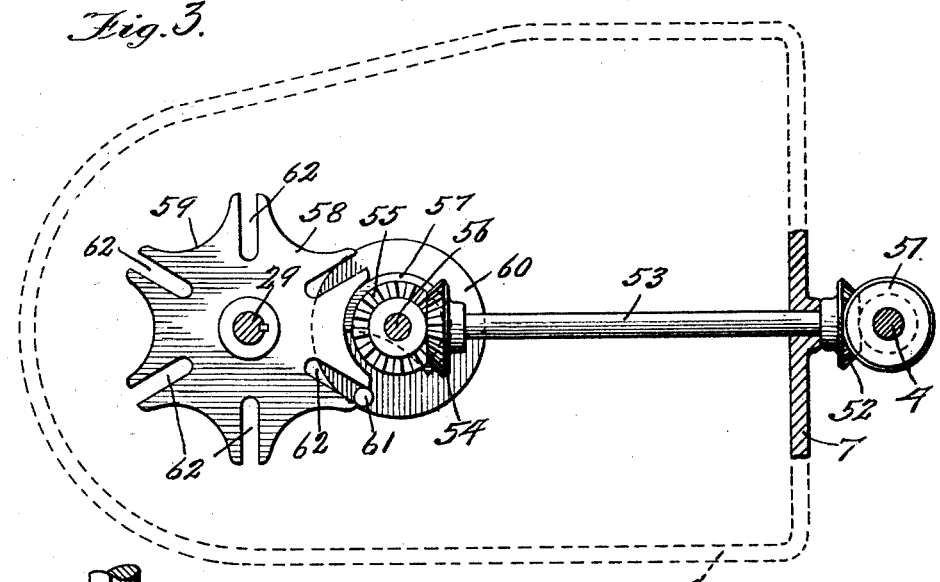
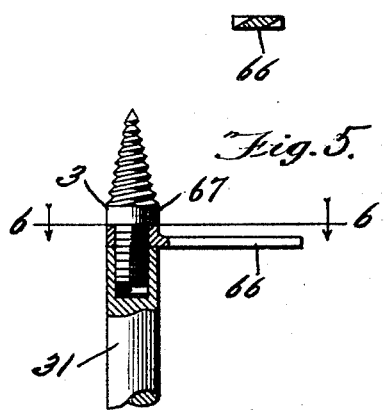

Patented June 10, 1930

1,762,438

UNITED STATES PATENT OFFICE

HENRY E. HAMILTON, FREDERICK C. KRUEGER, AND ADOLPH HAMILTON, OF NEW LONDON, WISCONSIN, ASSIGNORS, BY MESNE ASSIGNMENTS, TO SAID HENRY E. HAMILTON

CORING MACHINE

Application filed September 20, 1924. Serial No. 738,873.

This invention relates to a coring machine.

It relates particularly to a machine for coring heads of cabbages or similar vegetables and loosening the outer leaves thereof.

An object of the invention is to provide a coring machine that is compact, efficient and simple of operation. Another object is to provide a machine in which the vegetable heads are automatically moved into and held in position for the coring and cutting operation.

Another object is to provide a coring machine wherein the coring and cutting means are raised, lowered and rotated automatically.

Another object is to provide in a coring machine, self-adjusting, resilient and flexible holding means for the vegetable heads.

Another object is to provide a coring machine that will, in proper sequence, automatically bring the vegetables in position to be cored, hold the same therein, raise, lower and rotate the coring and cutting means and then move the vegetables from the coring position.

Other objects and advantages will hereinafter appear.

An embodiment of the invention is shown in the accompanying drawings, in which:

Fig. 3 is a view of the actuating mechanism for the rotatable support or table,

Fig. 4 is a sectional view of the operating means for the coring tool,

Fig. 5 is a view of the coring and cutting means,

Fig. 6 is a section on line 6—6 of Fig. 5,

Fig. 7 is a section on line 7—7 of Fig. 6,

Fig. 9 is a view showing a head of cabbage and the manner in which the central part or core thereof is cut up by the machine.

Figure 1:
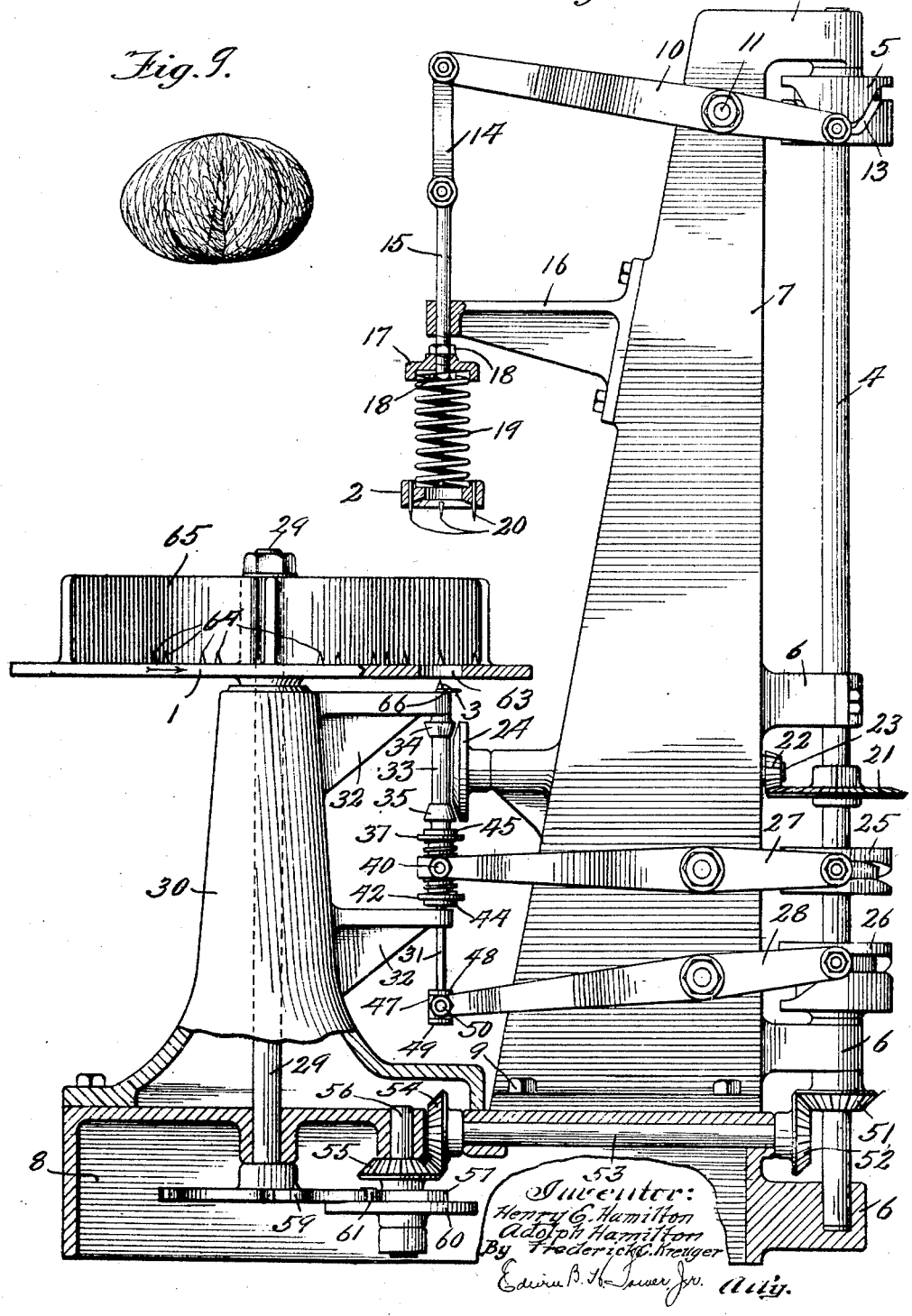
Fig. 1 is a side elevation, partly in section, of the machine.
Figure 2:
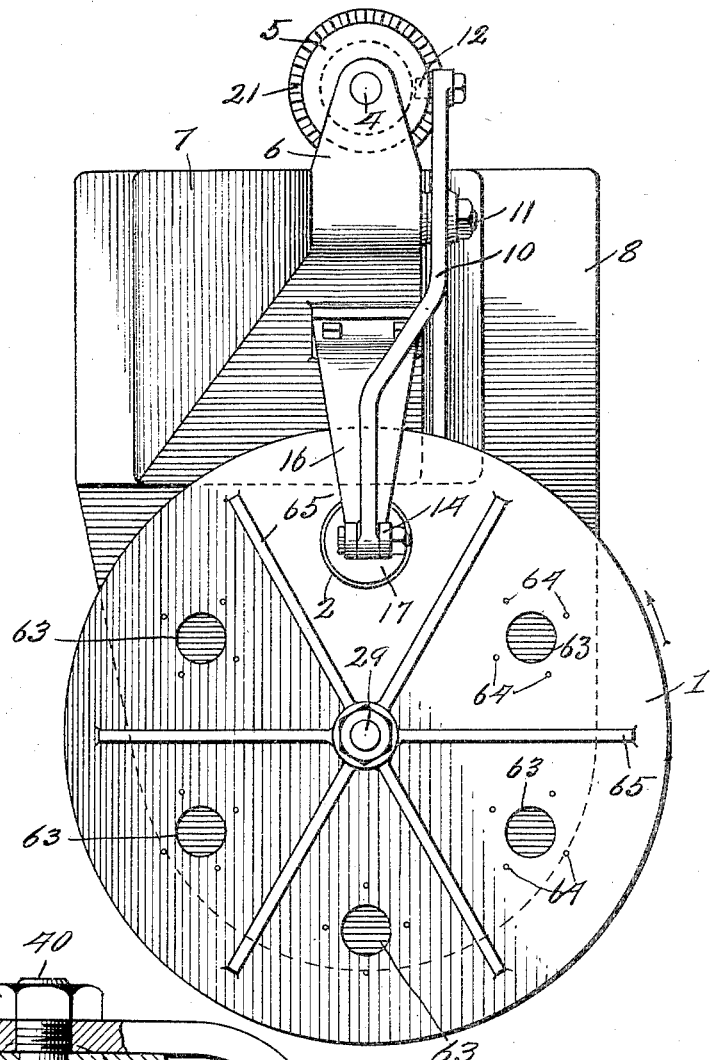
Fig. 2 is a plan view.

The machine comprises, in general, a support or rotatable table 1 to move the vegetable heads into position, a holder 2 therefor, and a tool 3 to cut up the core.

These parts, and the operating mechanism therefor, are mounted upon a single support or base for automatic action together.

A drive shaft 4, having a cam 5 at the upper end thereof, is journaled in brackets 6 of a standard 7 secured to a base 8 by bolts 9 or other suitable means.

An actuating lever 10 for holder 2 is pivotally supported at 11 by standard 7. One end of the lever 10 carries a roller 12 which engages a slot 13 in cam 5.

A link 14 connects a plunger 15 to the other end of lever 10 for reciprocation through a bracket 16 secured to standard 7.

A cap 17 is secured to the lower end of plunger 15 by means of nuts 18 threaded on the end thereof.

A spring 19 connects holder 2 and cap 17. The ends of the spring may be secured to these parts in any suitable way.

Holder 2 is provided with spikes 20 to puncture and hold the vegetable head in position on table 1 to have the core thereof cut up.

A bevel gear 21 is mounted upon shaft 4 to mesh with a pinion 22 at one end of a shaft 23.

Shaft 23 is journaled in standard 7 and carries a disk 24 at the other end thereof.

Cams 25 and 26 are fixed to the lower end of shaft 4 to actuate levers 27 and 28 in the same manner as cam 5 actuates lever 10.

Levers 27 and 28 are pivotally mounted on the standard 7.

A shaft 29 to rotate table 1 is journaled in the base 8 and in a standard 30 secured thereto adjacent to standard 7.

An operating shaft 31 for the tool is rotatably and slidably mounted in bracket 32 integral with standard 30.

The upper end of a sleeve 33 is provided with conical disks 34 and 35 for engagement with the beveled edge of disk 24. The sleeve 33 is splined to shaft 31 for rotation therewith and has sliding movement thereon.

A collar 36 provided with a flange 37 at the upper end thereof is loosely mounted on the lower end of sleeve 35. The sleeve 33 is thus free to rotate within the collar 36.

The end of lever 27 is bifurcated to embrace and pivotally connect with a pair of blocks 38. The blocks 38 are splined to fit collar 36 for sliding movement thereon by means of a key 39.

Figure 8:
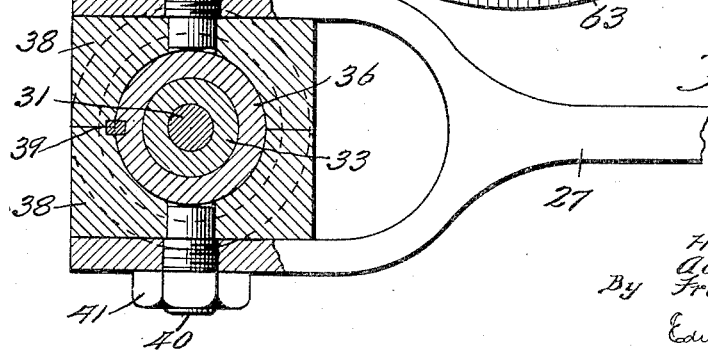
Fig. 8 is a section on line 8—8 of Fig. 4.

Stud bolts 40 are threaded into the ends of lever 27 and locked in position by means of nuts 41. The ends of bolts 40 are received by blocks 38, as shown in Fig. 8, to provide the pivotal connection with lever 27.

A nut 42 is screwed to the lower end of collar 36 and locked thereon by means of a pin 43.

A nut 44 is likewise screwed and locked to the lower end of sleeve 33. Nut 44 and a flange 45 integral with sleeve 33 hold collar 36 from longitudinal movement on the sleeve.

The sliding movement of blocks 38 on the collar 36 is cushioned by means of spring 46 arranged between the blocks and flange 37 and nut 42.

A square block 47 is loosely mounted on the lower end of shaft 31 and held in place thereon against longitudinal displacement by means of flanges 48 and 49 fixed to the shaft.

One end of lever 28 is pivoted at 50 to block 47.

A bevel gear 51 fixed to shaft 4 meshes with a bevel gear 52 at one end of a shaft 53 journaled in base 8. The other end of shaft 53 carries a gear 54 which meshes with a gear 55 on a stud shaft 56 journaled in the base 8.

The lower end of the shaft 56 carries a disk 57 which engages the ends of the arms 58 of a wheel 59 fixed to the lower end of shaft 29.

A disk 60, fixed to shaft 56 below disk 57, is provided with a peg 61 to cooperate with slots 62 cut in wheel 59.

The table 1 is provided with openings 63 to receive tool 3.

Spikes 64 may be arranged around openings 63 to hold the vegetable heads in proper position on the table. The table 1 is provided with partitions or webs 65 extending radially from the center thereof to assist in holding the vegetable heads in proper position over the openings 63.

The tool 3 comprises a knife 66 fixed to the upper end of shaft 31 by means of a stud 67 screwed into the end of the shaft, as shown in Fig. 5. The knife 66 is applied to the bottom of the vegetable head to loosen and partly cut away the outer leaves thereof at the core.

The upper portion of stud 67 is conical and threaded to enter the vegetable head and cut up the core thereof, as indicated in Fig. 9.

The cutting edges of knife 66 may be beveled, as shown in Figs. 6 and 7.

A tool 3 is thereby provided which readily enters the vegetable head, cuts up the core and loosens the outer leaves thereof.

The operation of the machine is as follows:

The vegetable heads are placed on table 1 over openings 63.

Cam 5 swings lever 10 in a counter-clockwise direction to move holder 2 downwardly to engage and hold a vegetable head in position over opening 63.

Cams 25 and 26 then swing levers 27 and 28 in a clockwise direction to slide shaft 31 upwardly through brackets 32 and to cause engagement of conical disk 35 of sleeve 33 with the beveled edge of disk 24.

The tool 3 is thereby rotated and elevated through opening 63 into the core of the vegetable.

Tool 3 is elevated a sufficient amount to insert the threaded upper portion of stud 67 into the core and to apply the rotating knife 66 to the bottom of the vegetable to loosen and partly cut away the outer leaves thereof at the core.

When cam 26 has moved tool 3 to its uppermost position within the vegetable, cam 25 swings lever 27 in a counterclockwise direction to slide conical disk 34 of sleeve 33 into engagement with disk 24. The direction of rotation of tool 3 is thereby reversed to facilitate removal thereof from the vegetable without removing any of the core.

Cam 26 then moves lever 28 in a counter-clockwise direction to withdraw the tool from the vegetable.

The parts are so timed that after tool 3 has been withdrawn from the vegetable, disk 57, shown in Fig. 3, is rotated out of engagement with wheel 59 to permit the same to be rotated by engagement of peg 61 with the sides of a slot 62.

Table 1 is thereby rotated so that the vegetables are successively and automatically moved into position between holder 2 and tool 3.

The actuating means for table 1, holder 2 and and tool 3 are synchronized and driven by a single shaft 4.

After the vegetables have been cored out and the outer leaves loosened, the latter are removed therefrom.

A machine adapted to remove and separate these leaves from the vegetables after the cores thereof have been cut up is shown and described in copending application, Serial No. 738,872, filed September 20, 1924.

This invention is, of course, susceptible of various other modifications and adaptations.

The invention claimed is:

1. A coring machine comprising a helical knife supported for rotation, means to support a vegetable in position adjacent to said knife, comprising a rotatable table provided with openings to receive said knife, means for moving said knife rectilinearly through an opening in said table and a member supported in line with said tool to hold the vegetable in position on said table.

2. In a coring machine, the combination of a core knife tool supported for rotation, a rotatable table adapted to support successive vegetables in position adjacent to said tool, means supported in line with said tool to hold each successive vegetable in position on said table, and automatic means to actuate said tool and holder oppositely upon vegetables presented thereto, while rotating the tool in the course of its advance and to rotate said table intermediate the operations of tool and holder to move the vegetables successively in position to be cored.

3. In a coring machine, a base, a table rotatably supported by said base, said table being provided with a plurality of openings, a tool supported by said base for rotation and movement through said oenings, a holder arranged in line with said tool and supported for movement to hold the vegetables in position on said table, a drive shaft, and means connecting said table, tool and holder to said shaft for cooperative movement together.

4. In a coring machine, the combination with a vegetable holder comprising a plunger, and a holding cap flexibly attached thereto, of a coring knife and means for the relative movement of said knife and cap in a core cutting operation.

5. In a coring machine, a vegetable holder comprising a reciprocating plunger, a holding cap flexibly attached thereto, and holding prongs arranged on said cap in combination with a coring knife rotatably and axially adjustable with reference to said cap.

6. In a coring machine, a vegetable holder comprising a plunger, a cap attached thereto, a second cap flexibly attached to said first cap, and holding prongs arranged on said second cap and a power actuated coring knife operatively mounted for engagement with a vegetable held by said second cap.

7. A coring machine comprising a corer, means for imparting a rectilinear motion thereto in one direction, means for imparting a rotary motion thereto in one direction during the said rectilinear motion thereof, means for imparting a rectilinear motion thereto opposite in direction to said first named rectilinear motion, means for imparting a rotary motion thereto opposite in direction to said first named rotary motion during the said second named rectilinear movement, and means to hold a vegetable relative to said corer, and means to feed vegetables to said holding means.

8. A coring machine comprising means for supporting the vegetables to be cored, automatically operable means for moving said supporting means and for successively bringing the vegetables into position for coring, means for holding the vegetables while in this position, means for inserting the corer into the vegetables and rotating the same in one direction, means for rotating the corer in the opposite direction, means for withdrawing the same from the vegetables, and means for causing the above named means to operatively function in proper sequence.

9. In a coring machine, a vegetable holder comprising a plunger and a cap secured thereto, means spaced therefrom and resiliently connected therewith for holding a vegetable, a core knife, a mounting for said plunger and knife providing for relative movement thereof to and from each other and connections for effecting such movement while rotating the knife.

10. In a coring machine, a vegetable holder comprising a vertical plunger, a cap secured thereto, a holding cap spaced therefrom and flexibly connected therewith whereby self-adjustment between said holding cap and a vegetable is obtained.

11. In a coring machine, a vegetable holder comprising a plunger, a cap secured thereto, a second cap spaced therefrom, a spring connecting said caps, and means on said second cap for gripping a vegetable.

12. In a coring machine, a vegetable holder comprising a plunger, a cap secured thereto, a second cap spaced therefrom, and compressible means interposed between said caps.

13. In a coring machine, a vegetable holder comprising two caps spaced apart and flexibly connected, one of said caps being provided with a central opening and means for holding a vegetable.

14. A coring machine comprising a rotatable core knife, means to support an article to be cored in position above said knife, means to hold the article upon said support, and means to cause relative longitudinal movement and simultaneous relative rotation of said knife and support and means for the mechanical withdrawal of an article upon which the knife has acted.

15. A coring machine comprising a threaded corer, means to rotate and reciprocate said corer, means to hold a vegetable in position to be cored thereby, and automatic means to feed vegetables successively to said holding means.

16. A coring machine comprising a rotary support for articles to be cored, a reciprocatory holder for articles carried by the support retractible for the release of such articles, a rotary and reciprocatory corer adapted in its reciprocation to enter rotatively an article held by said holder, and means to impart the respective motions to said parts in timed relation for the engagement of said holder and corer with successive articles carried by the support.

17. A machine for cutting cores which comprises in combination a knife having a helically pitched blade, a work supporting conveyor adapted to carry thereto successive pieces of work, means for producing rectilinear relative movement of said knife and conveyor to a position in which said knife will penetrate work upon said conveyor, and means for rotating said knife in the course of such relative movement in a direction to screw it into such work.

18. A machine for cutting cores which comprises in combination a knife having a helically pitched blade, a work supporting conveyor adapted to carry thereto successive pieces of work, means for producing rectilinear relative movement of said knife and conveyor to a position in which said knife will penetrate work upon said conveyor, and means for rotating said knife in the course of such relative movement in a direction to screw it into such work, together with means for producing retractive relative movement between said knife and conveyor while reversely rotating said knife.

19. A machine for cutting cores which comprises in combination, a turntable upon which articles having cores may be supported, a core knife adapted to cut without severing the core of a product upon the turn table, a mounting for said knife in which said knife is rotatable, means for rotating the turn table and articles thereon, means operable in accordance with the rotative position of the turn table for actuating said mounting and articles carried by the table linearly relatively to each other, and mechanism operative during such relative adjustment for rotating said knife.

20. A machine for cutting cores which comprises in combination an apertured turn table, a rotatable core knife receivable through the aperture and actuating connections provided with mechanical means for the rectilinear relative adjustment of said core knife and table and the simultaneous rotation of said knife.

21. A machine for cutting cores which comprises in combination an apertured turn table, a rotatable core knife receivable through the aperture and actuating connections provided with means for the mechanical adjustment of said core knife and table and the simultaneous rotation of said knife, and control mechanism adapted for the operation of said connections in accordance with the rotative position of the table.

22. A machine for cutting cores which comprises the combination with an apertured turn table and means for the step by step rotation of said turn table to adjust its apertures successively into registry with a predetermined station, of core cutting means at said station comprising a rotatable knife retractible below said table and mounted for rectilinear movement through an aperture therein.

23. A machine for cutting cores which comprises the combination with an apertured turn table and means for the step by step rotation of said turn table to adjust its apertures successively into registry with a predetermined station, of core cutting means at said station comprising a rotatable knife retractible below said table and mounted for rectilinear movement through an aperture therein, and actuating connections for said knife comprising a knife advancing and retracting means automatically operable in synchronism with the arrival of an aperture of said table in registry with said station and during the dwell of said aperture thereat.

24. A machine for cutting cores which comprises the combination with an apertured turn table and means for the step by step rotation of said turn table to adjust its apertures successively into registry with a predetermined station, of core cutting means at said station comprising a rotatable knife retractible below said table and mounted for rectilinear movement through an aperture therein, and actuating connections for said knife comprising a knife advancing and retracting means automatically operable in synchronism with the arrival of an aperture of said table in registry with said station and during the dwell of said aperture thereat, and means for rotating the knife in one direction during its advance and reversely during its retraction.

25. In a coring machine, the combination with a clamp comprising separable members relatively adjustable into engagement with an article having a core, one of said members being a conveyor adapted to receive other articles, of a knife receivable through a hole in one of said members and provided with means for rotating it and simultaneously advancing it through said hole.

26. In a coring machine, the combination with a clamp comprising separable members relatively adjustable into engagement with an article having a core, one of said members being a part of a conveyor adapted to receive other articles, of means for the movement of said conveyor, means for mechanically actuating said clamp at a predetermined point in such actuation, and a knife receivable through a hole in one of said members into the core of an article clamped thereby, said knife and member being provided with mechanical connections for their relative advance and retraction and simultaneous rotation of said knife.

27. In a coring machine, the combination with a clamp comprising separable members relatively adjustable into engagement with an article having a core, one of said members being a part of a conveyor adapted to receive other articles, of means for the movement of said conveyor, means for mechanically actuating said clamp at a predetermined point in such actuation, and a knife receivable through a hole in one of said members into the core of an article clamped thereby, said knife and member being provided with mechanical connections for their relative advance and retraction and simultaneous rotation of said knife, said clamp actuating means including yieldable connections to one of said members.

28. In a coring machine, the combination with a clamp comprising separable members relatively adjustable into engagement with an article having a core, one of said members being a part of a conveyor adapted to receive other articles, of means for the movement of said conveyor, means for mechanically actuating said clamp at a predetermined point in such actuation, and a knife receivable through a hole in one of said members into the core of an article clamped thereby, said knife and member being provided with mechanical connections for their relative advance and retraction and simultaneous rotation of said knife, said knife having a helical blade adapted to screw into the core during the relative advance of the knife and to withdraw upon the same path during relative retractive movement.

29. The combination with a work conveyor, and a core knife; of a frame supporting said conveyor and knife for relative translative movement to present work to the knife, relative axial movement for penetration of the work by the knife, and simultaneous relative rotative movement for effecting the cutting of the core by the knife, and means for mechanically effecting such movements in the aforesaid sequence.

30. The combination with a work conveyor and a core knife; of a frame supporting said conveyor and knife for relative translative movement to present work to the knife, relative axial movement for penetration of the work by the knife, and simultaneous relative rotative movement for effecting the cutting of the core by the knife, and means for mechanically effecting such movements in the aforesaid sequence, together with means for mechanically effecting reverse relative rotative and axial movement between the knife and conveyor, whereby to withdraw the knife, and subsequently withdrawing the work by continued relative translative movement between said knife and conveyor.

31. In a coring machine, the combination with a coring knife, of a turn table for presenting work thereto and provided with partitions projecting outwardly from its central portion and against which the work may be centered.

32. In a coring machine, the combination with a coring knife, of means for presenting work thereto comprising a conveyor having converging partitions adapted to center work thrust thereagainst, and means for operating said conveyor to bring a portion thereof between partitions into registry with said knife.

33. In a coring machine, the combination with a reciprocably mounted coring knife, of a turn table having apertured portions bounded by converging partitions symmetrically disposed adjacent the apertures to center work thereon, and actuating means for said table adapted to move each hole successively into registry with said knife and knife driving means synchronized with said table actuating means and adapted to operate said knife through each hole for a core cutting operation upon a vegetable centered with reference thereto.

HENRY E. HAMILTON.
ADOLPH HAMILTON.
FREDERICK C. KRUEGER.